US007953433B2

(12) United States Patent
Langlois et al.

(10) Patent No.: US 7,953,433 B2
(45) Date of Patent: May 31, 2011

(54) DATA STORAGE DEVICE AND DATA STORAGE DEVICE TRACING SYSTEM

(75) Inventors: Denis J. Langlois, River Falls, WI (US); Purushotham G. Lala Balaji, St. Paul, MN (US); Sanjay Gupta, Woodbury, MN (US)

(73) Assignee: Imation Corp., Oakdale, MN (US)

(*) Notice: Subject to any disclaimer, the term of this patent is extended or adjusted under 35 U.S.C. 154(b) by 1015 days.

(21) Appl. No.: 11/789,181

(22) Filed: Apr. 24, 2007

(65) Prior Publication Data

US 2008/0268896 A1 Oct. 30, 2008

(51) Int. Cl.

| | |
|---|---|
| ***H04M 1/00*** | (2006.01) |
| ***H04W 24/00*** | (2009.01) |
| ***H04B 5/00*** | (2006.01) |

(52) U.S. Cl. ............... 455/550.1; 455/456.1; 455/456.6; 455/41.1; 340/10.1; 340/539.13

(58) Field of Classification Search ............... 455/550.1, 455/456.1, 456.6

See application file for complete search history.

(56) References Cited

U.S. PATENT DOCUMENTS

| | | | |
|---|---|---|---|
| 4,945,428 | A | 7/1990 | Waldo |
| 5,235,695 | A | 8/1993 | Pence |
| 5,245,485 | A | 9/1993 | Dunn et al. |
| 5,253,821 | A | 10/1993 | Johnson |
| 5,278,970 | A | 1/1994 | Pence |
| 5,303,214 | A | 4/1994 | Kulakowski et al. |
| 5,761,503 | A | 6/1998 | Fisher |
| 5,805,864 | A | 9/1998 | Carlson et al. |
| 5,809,511 | A | 9/1998 | Peake |
| 5,910,776 | A | 6/1999 | Black |
| 5,916,717 | A | 6/1999 | Yang et al. |
| 5,935,758 | A | 8/1999 | Patel et al. |
| 5,945,249 | A | 8/1999 | Patel et al. |
| 5,949,342 | A | 9/1999 | Frary et al. |
| 5,970,273 | A | 10/1999 | Zenk et al. |
| 5,971,281 | A | 10/1999 | Frary et al. |
| 5,982,282 | A | 11/1999 | Ryan, Jr. |
| 6,022,440 | A | 2/2000 | Nordeen et al. |
| 6,100,788 | A | 8/2000 | Frary |

(Continued)

FOREIGN PATENT DOCUMENTS

| | | |
|---|---|---|
| EP | 1225577 | 11/2004 |

(Continued)

OTHER PUBLICATIONS

White Paper entitled "ZigBee Technology: Wireless Control that Simply Works," Patrick Kinney, Communications Design Conference, Oct. 2, 2003, pp. 1-20.

(Continued)

*Primary Examiner* — Nick Corsaro
*Assistant Examiner* — Tangela T. Chambers
(74) *Attorney, Agent, or Firm* — Shumaker & Sieffert, P.A.

(57) ABSTRACT

A data storage device tracing system includes at least one container configured to maintain at least one electronic data storage device, a two-way radio coupled to each of the container(s), and a network including a network coordinator configured to transmit to and receive data from the two-way radio. In this regard, the two-way radio communicates real-time container location data to the network coordinator to enable real-time tracing of the container(s) and the electronic data storage device(s).

6 Claims, 9 Drawing Sheets

U.S. PATENT DOCUMENTS

| | | | | |
|---|---|---|---|---|
| 6,169,483 | B1 | 1/2001 | Ghaffari et al. | |
| 6,201,474 | B1 | 3/2001 | Brady et al. | |
| 6,201,662 | B1 | 3/2001 | Graves et al. | |
| 6,226,688 | B1 | 5/2001 | Frary | |
| 6,260,006 | B1 | 7/2001 | Wong et al. | |
| 6,266,211 | B1 | 7/2001 | Thomas, III et al. | |
| 6,307,468 | B1 | 10/2001 | Ward, Jr. | |
| 6,336,163 | B1 | 1/2002 | Brewer et al. | |
| 6,336,173 | B1 | 1/2002 | Day, III et al. | |
| 6,346,884 | B1 | 2/2002 | Uozumi et al. | |
| 6,519,678 | B1 | 2/2003 | Basham et al. | |
| 6,633,454 | B1 | 10/2003 | Martin et al. | |
| 6,636,778 | B2 | 10/2003 | Basham et al. | |
| 6,690,539 | B2 | 2/2004 | Gallo et al. | |
| 6,826,004 | B2 | 11/2004 | Albrecht et al. | |
| 6,845,279 | B1 | 1/2005 | Gilmore et al. | |
| 6,851,617 | B2 | 2/2005 | Saint et al. | |
| 6,860,609 | B2 | 3/2005 | Olson et al. | |
| 6,950,723 | B2 | 9/2005 | Gallo et al. | |
| 6,957,086 | B2 | 10/2005 | Bahl et al. | |
| 6,999,028 | B2 | 2/2006 | Egbert | |
| 7,015,817 | B2 | 3/2006 | Copley et al. | |
| 7,018,454 | B2 | 3/2006 | Wood et al. | |
| 7,020,755 | B2 | 3/2006 | Gibble et al. | |
| 7,023,341 | B2 | 4/2006 | Stilp | |
| 7,024,155 | B2 | 4/2006 | Gosieski, Jr. | |
| 7,028,158 | B1 * | 4/2006 | Beatty et al. | 711/202 |
| 7,044,605 | B2 | 5/2006 | Olson et al. | |
| 7,055,956 | B2 | 6/2006 | Olson et al. | |
| 7,066,990 | B2 | 6/2006 | Wood et al. | |
| 7,070,110 | B2 | 7/2006 | Lapstun et al. | |
| 7,080,277 | B2 | 7/2006 | Anna et al. | |
| 7,085,895 | B2 | 8/2006 | Kishi | |
| 7,089,099 | B2 | 8/2006 | Shostak et al. | |
| 7,097,106 | B2 | 8/2006 | Silverbrook et al. | |
| 7,098,784 | B2 | 8/2006 | Easley et al. | |
| 7,128,265 | B2 | 10/2006 | Silverbrook et al. | |
| 7,128,270 | B2 | 10/2006 | Silverbrook et al. | |
| 7,212,127 | B2 | 5/2007 | Jacober et al. | |
| 7,299,990 | B2 | 11/2007 | Hoshina | |
| 7,368,032 | B2 | 5/2008 | Green et al. | |
| 7,378,958 | B2 * | 5/2008 | Twitchell, Jr. | 340/539.13 |
| 7,425,898 | B2 | 9/2008 | Ryckman | |
| 7,481,371 | B2 | 1/2009 | Heidorn | |
| 7,660,812 | B2 | 2/2010 | Findlay et al. | |
| 2001/0000019 | A1 | 3/2001 | Bowers et al. | |
| 2002/0008623 | A1 | 1/2002 | Garber et al. | |
| 2002/0044058 | A1 | 4/2002 | Heinrich et al. | |
| 2002/0075589 | A1 | 6/2002 | Unno | |
| 2002/0084324 | A1 | 7/2002 | Johnson et al. | |
| 2002/0147650 | A1 | 10/2002 | Kaufman et al. | |
| 2002/0180588 | A1 | 12/2002 | Erickson et al. | |
| 2002/0191322 | A1 | 12/2002 | Jerman | |
| 2003/0002214 | A1 | 1/2003 | Kitamura et al. | |
| 2003/0227382 | A1 * | 12/2003 | Breed | 340/539.13 |
| 2005/0021524 | A1 | 1/2005 | Oliver | |
| 2005/0057847 | A1 | 3/2005 | Armagost et al. | |
| 2005/0061870 | A1 | 3/2005 | Stockton | |
| 2005/0093690 | A1 | 5/2005 | Miglionico | |
| 2005/0133583 | A1 | 6/2005 | Tada | |
| 2005/0149413 | A1 | 7/2005 | Amling et al. | |
| 2005/0162331 | A1 | 7/2005 | Endo et al. | |
| 2005/0168339 | A1 | 8/2005 | Arai et al. | |
| 2005/0261401 | A1 | 11/2005 | Wood et al. | |
| 2006/0040074 | A1 | 2/2006 | Wood et al. | |
| 2006/0055552 | A1 * | 3/2006 | Chung et al. | 340/686.1 |
| 2006/0118229 | A1 | 6/2006 | Ohashi et al. | |
| 2006/0124738 | A1 | 6/2006 | Wang et al. | |
| 2006/0132576 | A1 | 6/2006 | Lowery et al. | |
| 2006/0145864 | A1 | 7/2006 | Jacober et al. | |
| 2006/0169773 | A1 | 8/2006 | Lyons et al. | |
| 2006/0200560 | A1 * | 9/2006 | Waugh et al. | 709/224 |
| 2006/0250235 | A1 * | 11/2006 | Astrin | 340/539.22 |
| 2006/0290491 | A1 * | 12/2006 | Wagner et al. | 340/539.26 |
| 2007/0047280 | A1 | 3/2007 | Haustein et al. | |
| 2007/0162180 | A1 | 7/2007 | Goodman et al. | |
| 2007/0164858 | A1 * | 7/2007 | Webb, Sr. | 340/539.26 |
| 2007/0204493 | A1 | 9/2007 | Foley et al. | |
| 2007/0296581 | A1 * | 12/2007 | Schnee et al. | 340/539.13 |
| 2008/0061935 | A1 | 3/2008 | Melendez et al. | |
| 2008/0065676 | A1 | 3/2008 | Hause et al. | |
| 2008/0067935 | A1 | 3/2008 | Lee | |
| 2008/0110778 | A1 * | 5/2008 | Gelardi et al. | 206/308.1 |
| 2008/0198022 | A1 | 8/2008 | Battles et al. | |

FOREIGN PATENT DOCUMENTS

| | | | |
|---|---|---|---|
| EP | 1672565 | A1 | 6/2006 |
| JP | 3605106 | B2 | 10/2004 |
| WO | WO 01/06507 | | 1/2001 |
| WO | WO2004/006051 | A2 | 1/2004 |

OTHER PUBLICATIONS

Article entitled "ZigBee SoCs provide cost-effective solutions," EE Times Online, Khan Tuan Le, http://www.eetimes.com/showArticle.jhtml?articleID=173600329, Nov. 8, 2005.

U.S. Appl. No. 11/726,907, entitled "System and Method for Tracing Data Storage Devices," filed Mar. 23, 2007.

U.S. Appl. No. 11/520,459, entitled "System and Method for Tracing Data Storage Devices," filed Sep. 13, 2006.

U.S. Appl. No. 11/726,908, entitled, "Traceable RFID Enable Data Storage Device," filed Mar. 22, 2007.

U.S. Appl. No. 11/709,511, entitled, "Inkjet Printable RFID Label and Method of Printing an Inkjet Printable RFID Label", filed Feb. 21, 2007.

"Imation AquaGuard™ Technology," Article from Imation Corp's website, 2006, pp. 1-5.

* cited by examiner

DATA STORAGE DEVICE AND DATA STORAGE DEVICE TRACING SYSTEM

BACKGROUND

Data storage devices have been used for decades in computer, audio, and video fields for storing large volumes of information for subsequent retrieval and use. Data storage devices continue to be a popular choice for backing up data and systems.

Data storage devices include data storage tape cartridges, hard disk drives, micro disk drives, business card drives, and removable memory storage devices in general. These data storage devices are useful for storing data and for backing up data systems used by businesses and government entities. For example, businesses routinely back up important information, such as human resource data, employment data, compliance audits, and safety/inspection data. Government sources collect and store vast amounts of data related to tax payer identification numbers, income withholding statements, and audit information. Congress has provided additional motivation for many publicly-traded companies to ensure the safe retention of data and records related to government required audits and reviews after passage of the Sarbanes-Oxley Act (Pub. L. 107-204, 116 Stat. 745 (2002)).

Collecting and storing data has now become a routine business practice. In this regard, the data can be generated in various formats by a company or other entity, and a backup or backups of the same data is often saved to one or more data storage devices that is/are typically shipped or transferred to an offsite repository for safe/secure storage and/or to comply with regulations. Occasionally, the backup data storage devices are retrieved from the offsite repository for review and/or updating. With this in mind, the transit of data storage devices between various facilities introduces a possible risk of loss or theft of the devices and the data stored that is stored on the devices.

Users of data storage devices have come to recognize a need to safely store, retain, and retrieve the devices. For example, backing up data systems can occur on a daily basis. Compliance audits and other inspections can require that previously stored data be produced on an "as-requested" basis. However, tracking the data stored and tracing where the device is located can be a challenging task. With this in mind, it is both desirable and necessary, from a business-practice standpoint, for users to be able to identify what data is stored on which device, and to locate where a specific device is.

The issue of physical data security and provenance is a growing concern for users of data storage devices. Thus, manufacturers and users both are interested in systems and/or processes that enable tracing and tracking of data storage devices. Improvements to the tracing and ability to immediately locate data storage devices used to store vital business data is needed by a wide segment of both the public and private business sector.

SUMMARY

One aspect provides a data storage device tracing system. The data storage device tracing system includes at least one container configured to maintain at least one electronic data storage device, a two-way radio coupled to each of the container(s), and a network including a network coordinator configured to transmit to and receive data from the two-way radio. In this regard, the two-way radio communicates real-time container location data to the network coordinator to enable real-time tracing of the container(s) and the electronic data storage device(s).

Another aspect provides a data storage device configured to be traced in a network of traceable data storage devices. The data storage device includes a housing defining an enclosure, data storage media disposed within the enclosure, and a device two-way radio coupled to the housing. In this regard, the device two-way radio communicates real-time data storage device location data to the network coordinator that is configured to communicate with the network of traceable data storage devices.

Another aspect provides a data storage device tracing system. The data storage device tracing system includes at least one container configured to maintain multiple electronic data storage devices, a network including a network coordinator, and means for the network coordinator to transmit to and receive real-time container location data from the container.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
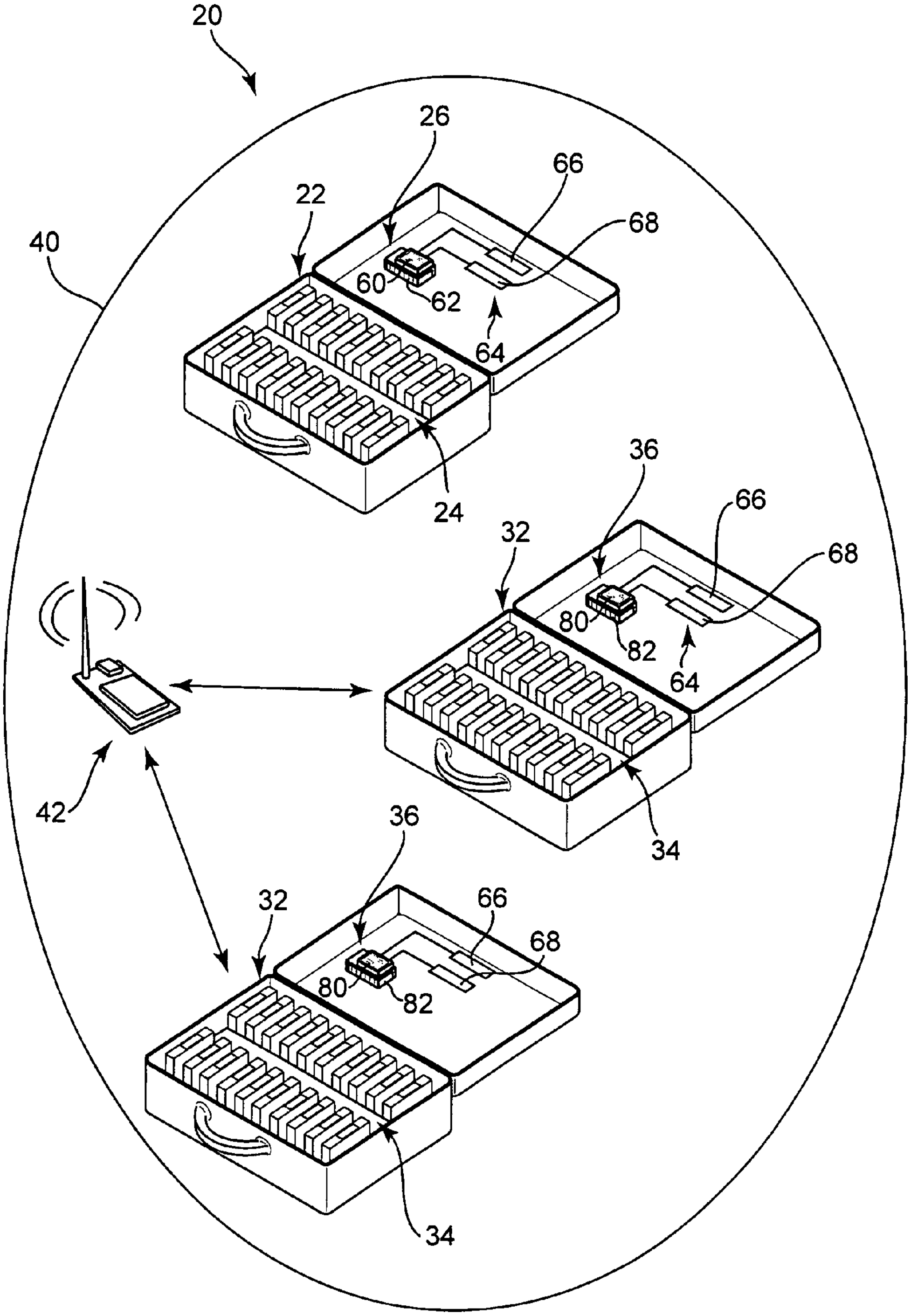
FIG. 1 is a diagrammatic view of a data storage device tracing system including traceable containers maintaining data storage devices according to one embodiment.

FIG. 1 is a diagrammatic view of a data storage device tracing system 20 according to one embodiment. The tracing system 20 includes a first container 22 maintaining electronic data storage devices 24 and a microprocessor 26, containers 32 maintaining other electronic data storage devices 34 and two-way radios 36, and a network 40 including a network coordinator 42 that communicates with the two-way radios

36. In one embodiment, the network 40 includes a network of multiple containers 32 each including multiple devices 34 and a two-way radio 36, and the two-way radios 36 communicate real-time location data of the containers 32 (and devices 34) to the network coordinator 42.

In general, the network coordinator 42 is configured to transmit data to, and receive data from, the two-way radios 36. The network 40 includes at least one network coordinator 42 and associated routers that communicate with the containers 22, 32 and one or more computers (not shown). In this manner, the network 40 provides real-time tracing of each container 32, logs the collected data to a database of the computer, and enables real-time monitoring (via the two-way radios 36) of the condition/status of the data storage devices 34 within the containers 32.

In one embodiment, the database is configured to manage logging of events with location and time, including: container 32/device 34 parameters such as transit and location, temperature, humidity, maintenance, power and battery replacement/recharge, signal strength, shock/vibration; check in/out of storage or data center protocol for internal use or shipping including: name/owner data, ID number, device ID, time, new location of use, ship-to address; and programmed security perimeter for memory device with data center alert and logging including: memory device security protocol, ping rate, security perimeter/alert (large and small perimeter), memory device loose security protocol having a lower ping rate, memory device security protocol off functions, addition of new memory device(s) into system, and tracking of old memory device exiting and disposal from system.

The containers 22, 32 are configured to house/contain multiple data storage devices 24, 34. In one embodiment, the containers 22, 32 are covered boxes formed of a durable shipping container material such as cardboard, metal, or plastic. Metal containers 22, 32 include some form of exteriorly mounted antenna connected to the two-way radios 36, such as a whip antenna connected to the two-way radios 36 and extending out of a container enclosure, or an exterior chip antenna configured to enable the two-way radio 36 to communicate through the metal enclosure. In other embodiments, the containers 22, 32 are specifically configured to protectively house multiple data storage devices for transport within and outside of a facility and include wheeled trolleys with lockable doors. In one exemplary embodiment, the containers 22, 32 are molded from a suitable plastic, such as polyester, polycarbonate, high density polyethylene, or Lexan™ HPX polycarbonate resin, available from GE Advance Materials, Fairfield, Conn. One suitable container is available from Hardigg, South Deerfield, Mass., and is identified as a STORM CASE®. Other suitable containers include those described in U.S. patent application Ser. No. 11/520,459, filed Sep. 13, 2006, entitled SYSTEM AND METHOD FOR TRACING DATA STORAGE DEVICES.

The electronic data storage devices 24, 34 include data storage tape cartridges, micro-hard drives, hard disk drives, quarter-inch cartridges and scaleable linear recording cartridges, to name but a few examples. The data storage devices 24, 34 are generally configured to store large volumes of data in a retrievable manner. Businesses have come to rely on such data storage devices 24, 34 to store business records and other data. The data is collected daily, necessitating the use of many data storage devices 24, 34. Occasionally, it is desirable to send some of the data storage devices 24, 34 to a secure storage facility, in part due to good business practices, and in part due to the logistics of storing a vast number of devices in a manner that is suited to the eventual retrieval of the devices. It is undesirable to misplace or damage even one of the data storage devices 24, 34 during transit. With this in mind, it is desirable to record or otherwise monitor the condition/status of the data storage devices 24, 34 in transit between sites within a facility and/or between two or more separate facilities.

Figure 2:
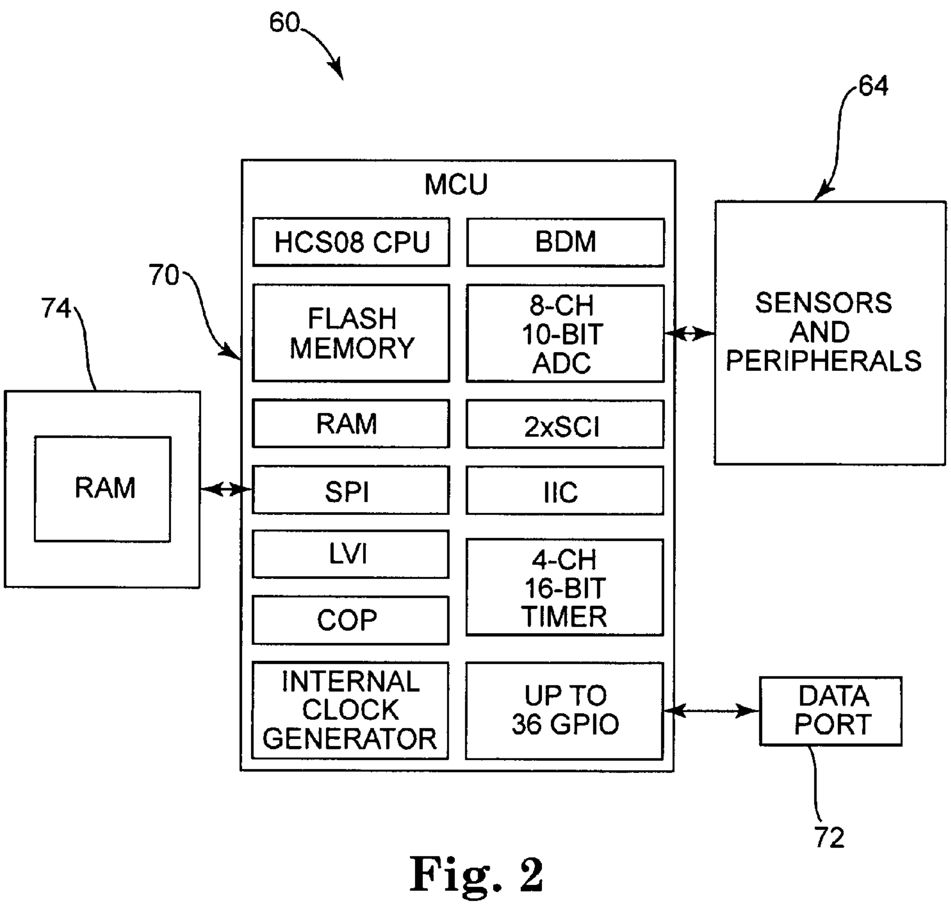
FIG. 2 is a diagrammatic view of a micro-controller configured to enable tracing of one of the containers illustrated in FIG. 1 according to one embodiment.

FIG. 2 is a diagrammatic view of one embodiment of a microcontroller unit 60 in accordance with microprocessor 26 configured to enable monitoring of the condition/status of the data storage devices 24 in transit. With concurrent reference to FIG. 1, the microcontroller unit (MCU) 60 is coupled to a power source such as a battery 62 and is configured to log the condition/status of devices 24 as measured by sensors 64. The battery 62 includes, for example, a lithium ion battery or other form of energy storage. In one embodiment, the sensors 64 include a temperature sensor 66 and an acceleration sensor 68 that are electrically coupled to the MCU 60. In other embodiments, the sensors 64 include one or more temperature sensors, acceleration sensors (including axial acceleration sensors), shock sensors, tamper sensors, and/or moisture/humidity sensors. In any regard, the sensors 64 monitor the condition/status of the data storage devices 24 during transit of the container 22. Suitable sensors are available from Measurement Specialties, Inc., Hampton, Va.

Referring to FIG. 2, one embodiment of the MCU 60 includes onboard memory components 70 to log shipping conditions, which can be downloaded by a data port 72. In one embodiment, MCU 60 includes additional memory 74 that communicates with a serial peripheral interface (SPI). As diagrammatically illustrated, MCU 60 includes various components including a central processing unit, flash memory, random access memory, service provider interface, low voltage interrupts, COP, internal clock generators, background debug module, an analog-to-digital converter, serial communication interface, inter-integrated circuit, a timer, and a general purpose input-output port. One embodiment of the MCU 60 provides a silicon chip-based controller including other circuits and/or other components suited for monitoring shipping conditions of the container 22. Suitable microcontroller units for MCU 60 are available from Freescale Semiconductor, Inc., Austin, Tex., one of which is identified as the HC08XX series.

In one embodiment, sensors 64 are coupled to an 8 channel 10 bit analog-to-digital converter, and the data port 72 is an RS 232 data port coupled to a general purpose input-output interface. During transit, the shipping conditions of the data storage devices 24 (FIG. 1) are recorded by the sensors 64 and this data is stored using the MCU 60 and non-volatile memory for subsequent downloading via the data port 72 or to a wireless router connected to a host. For example, a business after having stored data on the storage device 24 would pack the devices 24 into the container 22 and set (or initialize) the MCU 60 for monitoring of the conditions to be recorded by the sensors 64. The container 22 would be shipped to a storage facility for eventual retrieval. Later, upon retrieval, the container 22 would be opened and the stored data on the device(s) 24 would be accessed. The MCU 60, and in particular the shipping data recorded and saved on the MCU 60, could be accessed by the business to verify or read the shipping history of the devices 24 during transit. In this manner, the MCU 60, in combination with the container 22 and the sensors 64, provides one method for the monitoring of shipping conditions of data storage devices in transit.

With additional reference to FIG. 1, and in contrast to container 22, the containers 32 maintain other electronic data storage devices 34 and the two-way radios 36, which are configured to communicate real-time in-transit location data of the containers 32 (and devices 34) to the network coordinator 42. Embodiments of the two-way radios 36 include cellular telephone devices, receiver/transmitter devices, and two-way radio devices formed on a chip. The two-way radios 36 communicate through the network coordinator 42 to log real-time data related to the containers 32 into a database or secure electronic device. One of skill in the art will recognize that outfitting each of the containers 32 with a cellular telephone form of a two-way radio presents a possibly expensive container-tracking solution. Embodiments described below present an affordable, effective solution to the real-time tracing of devices and containers.

Figure 3:
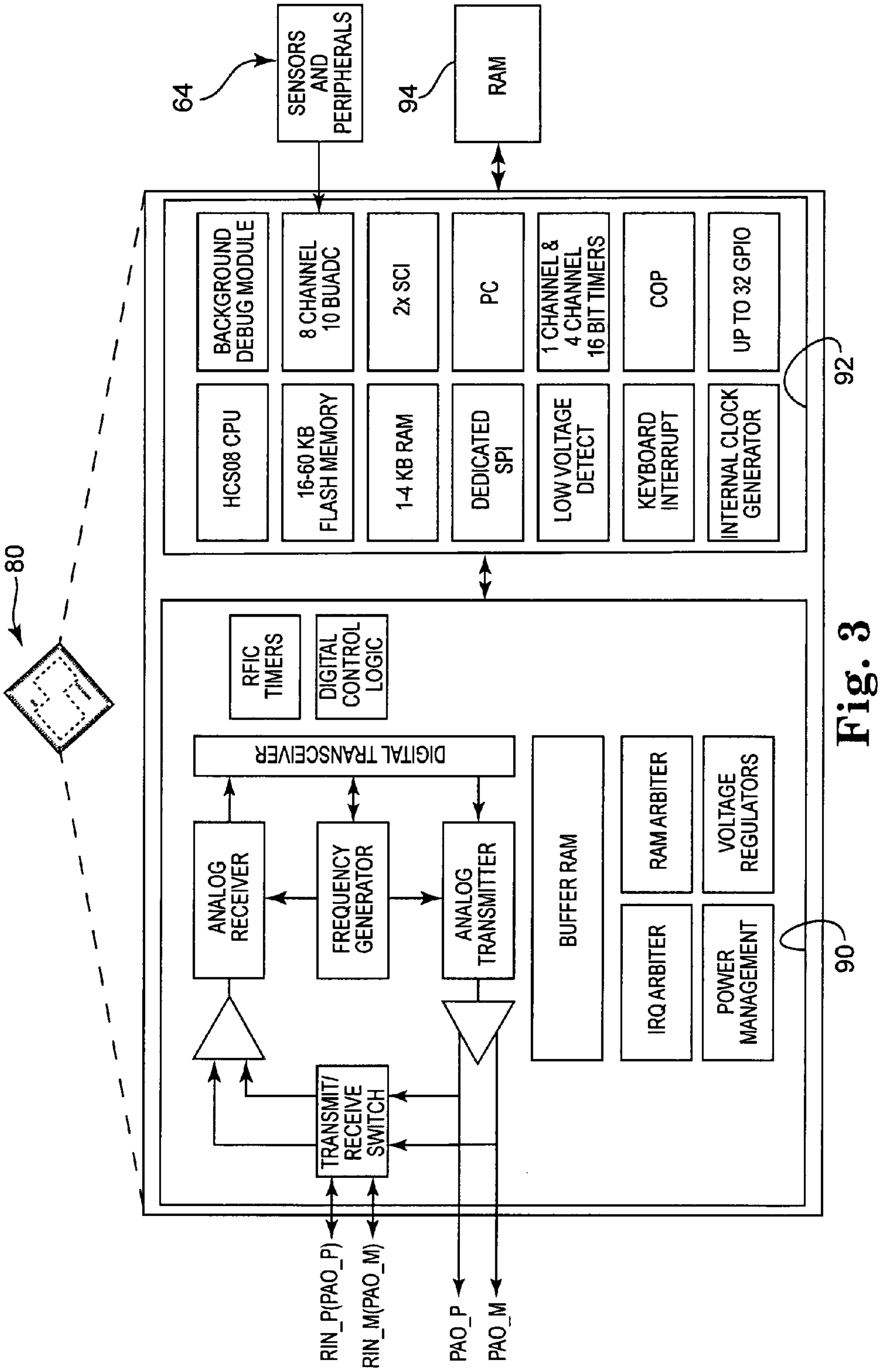
FIG. 3 is a diagrammatic view of a two-way radio configured to enable tracing of one of the containers illustrated in FIG. 1 according to one embodiment.

FIG. 3 is a diagrammatic view of one embodiment of a two-way radio chip 80 in accordance with the two-way radio 36 illustrated in FIG. 1. With concurrent reference to FIG. 1, the two-way radio chip 80 is coupled to a power source such as a battery 82 and is configured to record the condition/status of devices 34 as measured by sensors 64. The two-way radio chip 80 includes a radio frequency (RF) transceiver 90 in communication with a microcontroller unit (MCU) 92. In one embodiment, the RF transceiver 90 includes an IEEE 802.15.4-compliant radio operating in the 2.4 GHz frequency band. In some embodiments, the RF transceiver 90 includes a low noise amplifier, a 1 mW nominal output power component, a voltage controlled oscillator (VCO), an integrated transmit/receive switch, onboard power supply regulation, and a full spread spectrum encoding and decoding components. Other transceivers operable at a frequency of 900 MHZ are also acceptable. In one embodiment, the battery 82 includes, for example, a lithium ion battery configured to power the sampling rate, or ping rate, of the two-way radio chip 80. A useable active device time of the two-way radio chip 80 of over several years is possible with ping rates above 30 second intervals with a lithium ion cell of 500 maH. Other power sources are also acceptable.

MCU 92 communicates with the RF transceiver 90 and includes various controller components suited for chip-level radio transceivers. In one embodiment, the MCU 92 is an onboard microcontroller that enables a communication stack and application programs to reside on one system-in-a-package (SIP). Other forms of microcontrollers are also acceptable.

In one embodiment, the radio frequency transceiver 90 and the MCU 92 are provided in a single land grid array referred to in this specification as a system-on-a-chip (SOC). One suitable land grid array package includes the 9×9×1 mm 71-pin land grid array ZigBee™ platform identified as the MC1321X family of ZigBee™ platforms available from Free Scale Semiconductor, Inc., Austin, Tex. For example, one embodiment of the two-way radio chip 80 includes a ZigBee™-compliant platform having a 2.4 GHz low power IEEE 802.15.4 compatible transceiver 90 and an HSC08MCU MCU 92 that are configured to communicate through a ZigBee™-compliant network coordinator 42 (FIG. 1). Other configurations of the two-way radio chip 80 are also acceptable. Specific fabrication data offering an elaborate description of a two-way radio chip is set forth in the Freescale Semiconductor Technical Data, Document No.: MC1321x, rev. 0.0, published March 2006, incorporated into this specification by reference in its entirety and available on the Internet.

Figure 4:
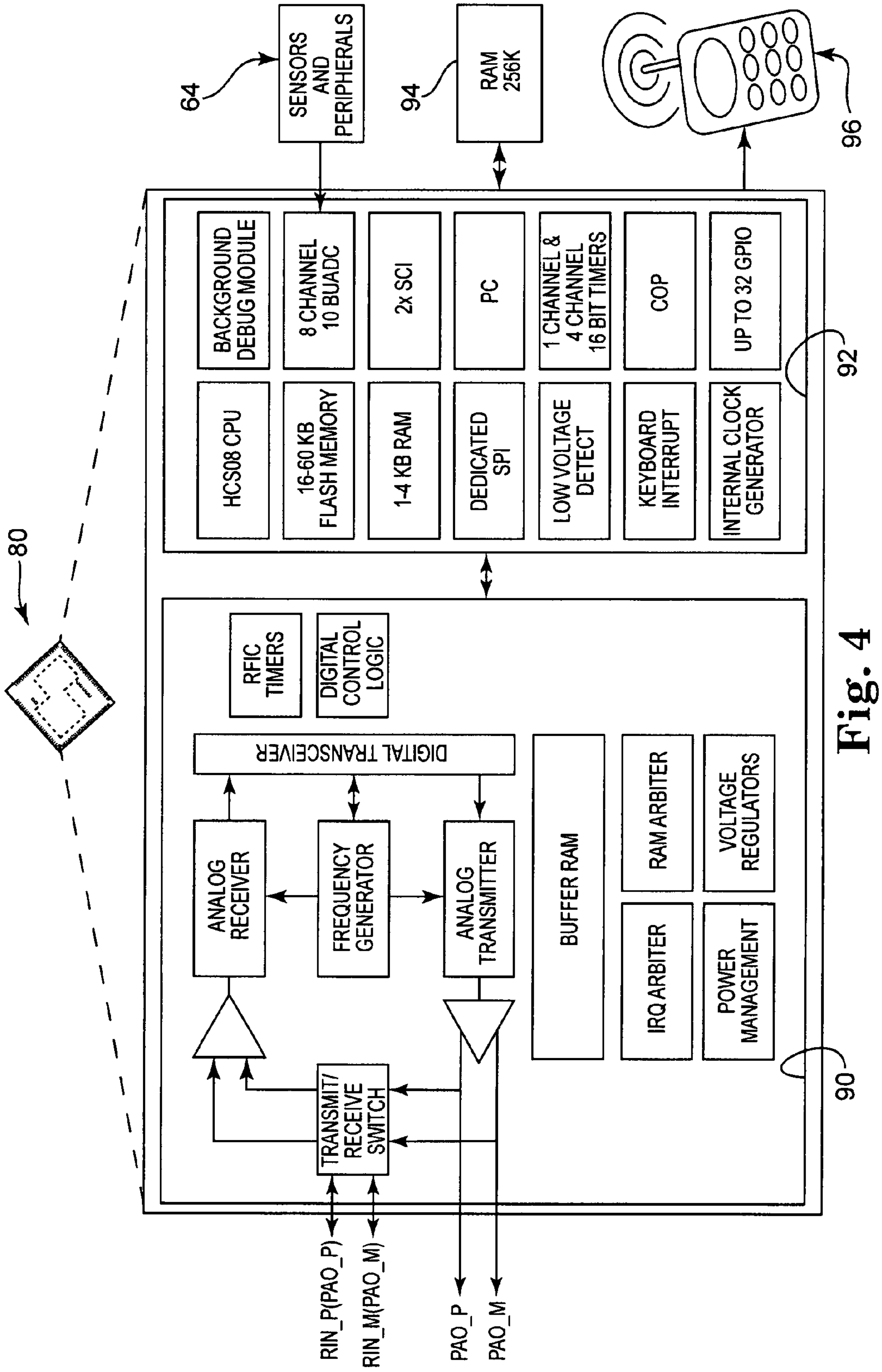
FIG. 4 is a diagrammatic view of another embodiment of a two-way radio including a cell-based/GPS locating system.

FIG. 4 is a diagrammatic view of the two-way radio chip 80 in communication with a cellular-based positioning system 96. In one embodiment, the cellular-based system 96 enables the real-time tracking and monitoring of a global position of multiple cell-based containers 32. In one embodiment, the cellular-based system 96 includes a global positioning system receiver, and the two-way radio chip 80 and the cellular-based system 96 are each configured to be a ZigBee™-compliant platform configured for redundant and secure tracking of all the containers 32 in the network 40. One suitable cellular-based system 96 includes a Boost Mobile i415 phone employing the Nextel™ Network, available from Accutracking.

In one embodiment, the cellular-based system 96 includes a personal data assistant (PDA) operable with Windows Mobile 5.0 software or higher. One suitable PDA includes a Dell™ Axim X51v available from Dell Inc. In this regard, the two-way radio chip 80 and the cellular-based system 96 are configured to communicate with the network controller 42, and through the network controller 42, to other cellular-enabled containers 32 to provide for the real-time tracing and tracking of containers 32 in a container tracking network. In another embodiment, the cellular-based system 96 is ZigBee™-enabled and includes an RFID reader and graphical user interface (GUI) that are configured to enable system 96 to audit in a single reading (i.e., a single scan) the presence of multiple data storage devices in a room, for example.

In the embodiments of FIGS. 3 and 4, the sensors 64 are configured to record the conditions that the devices 34 are subjected to. This transport data (i.e., the recorded conditions) is stored in the MCU 92 and/or the RAM 94. The network coordinator 42 is configured to log the container conditions during the shipping process, including whether a container has been removed from its shipping pallet or from its delivery truck. For example, one embodiment of the network 40 includes multiple network coordinators 42, including at least one network coordinator 42 on each pallet carrying containers 32. The network coordinator 42 associated with the pallet is configured to record data from each of the two-way radios 36 within the containers 32. In another embodiment, each container 32 is a network node and the network 40 includes at least one network coordinator 42 associated with routers that communicate with the container/node. In this manner, the network 40 is configured to trace the pallet of containers 32, each of the containers 32 individually, and the data storage devices 34 within the containers 32.

Each of the containers 32 is configured to be individually monitored. If any one of the containers 32 is removed from the network 40, the network controller 42 is configured to recognize and record the container 32 absence from the network 40. Upon re-entry of the container 32 to the system 20, the network controller 42 recognizes an electronically stored address programmed into the two-way radio chip 80, and "permits" re-entry or acknowledges the presence of the container 32, enabling its re-entry seamlessly back into the system 20. In this manner, the network 40 is configured to track the conditions/positions of the containers 32 in real-time, in addition to enabling inter-communication and real-time data transfer between containers 32 within the network 40.

Figure 5:
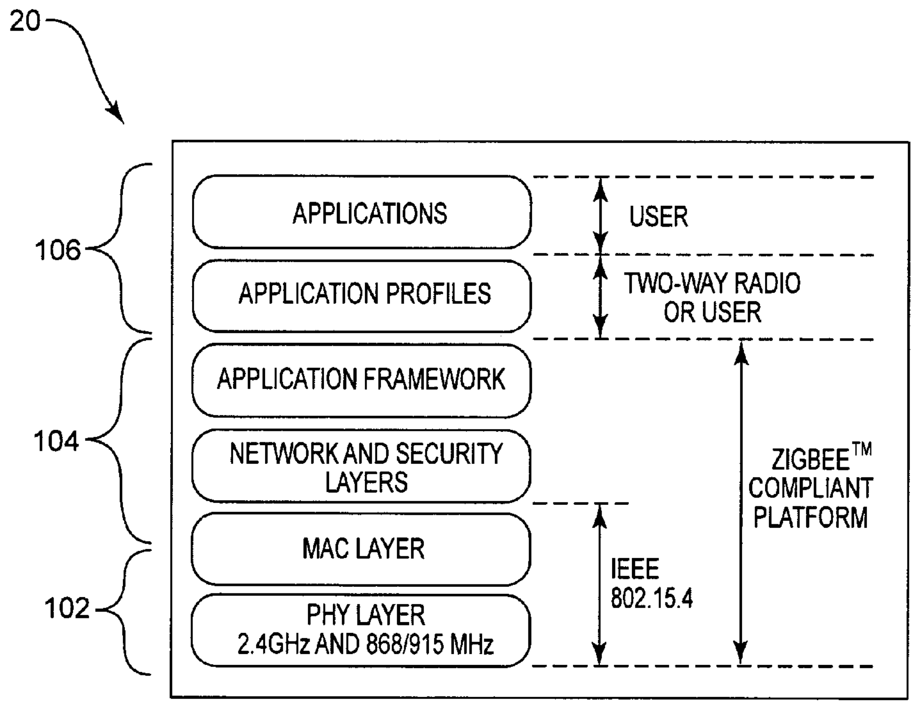
FIG. 5 is a diagrammatic view of the data storage device tracing system including a ZigBee™-compliant platform according to one embodiment.

FIG. 5 is a diagrammatic view of the tracing system 20 according to one embodiment. The tracing system 20 is represented by a working model including a semiconductor component 102, a ZigBee™ stack 104 coupled to the semiconductor component 102, and an application platform 106 in communication with the semiconductor component 102 and the ZigBee™ stack 104. In one embodiment, the semiconductor component includes a physical layer and a portion of a media access control layer. In one embodiment, the ZigBee™ stack 104 includes a portion of the media access control layer, network and security layers, and application framework layers. In combination, the physical layer and the media access control layer comprises the IEEE 802.15.4 standard, and the semiconductor component 102 and the ZigBee™ stack 104 comprise a ZigBee·—compliant platform. During use, for example when the two-way radio chip 80 is coupled to the container 36, the two-way radio chip 80 or the user initiates the transfer of data through the use of various application profiles.

In one embodiment, the physical layer includes receiver energy detection, a link quality indication, and a clear channel assessment. In one embodiment, the semiconductor component 102 controls access to radio channels employing carrier sense multiple access with collision avoidance methology, and handles Network (dis)association and media access control layer security. In one embodiment, the media access control layer security is AES-128 encryption based.

In one embodiment, the semiconductor component 102 and the ZigBee™ stack 104 combine to discover devices entering the network 40, configure the network 40, and support network topologies such as star, mesh (peer-to-peer) and cluster topologies, as described below.

Figure 6:
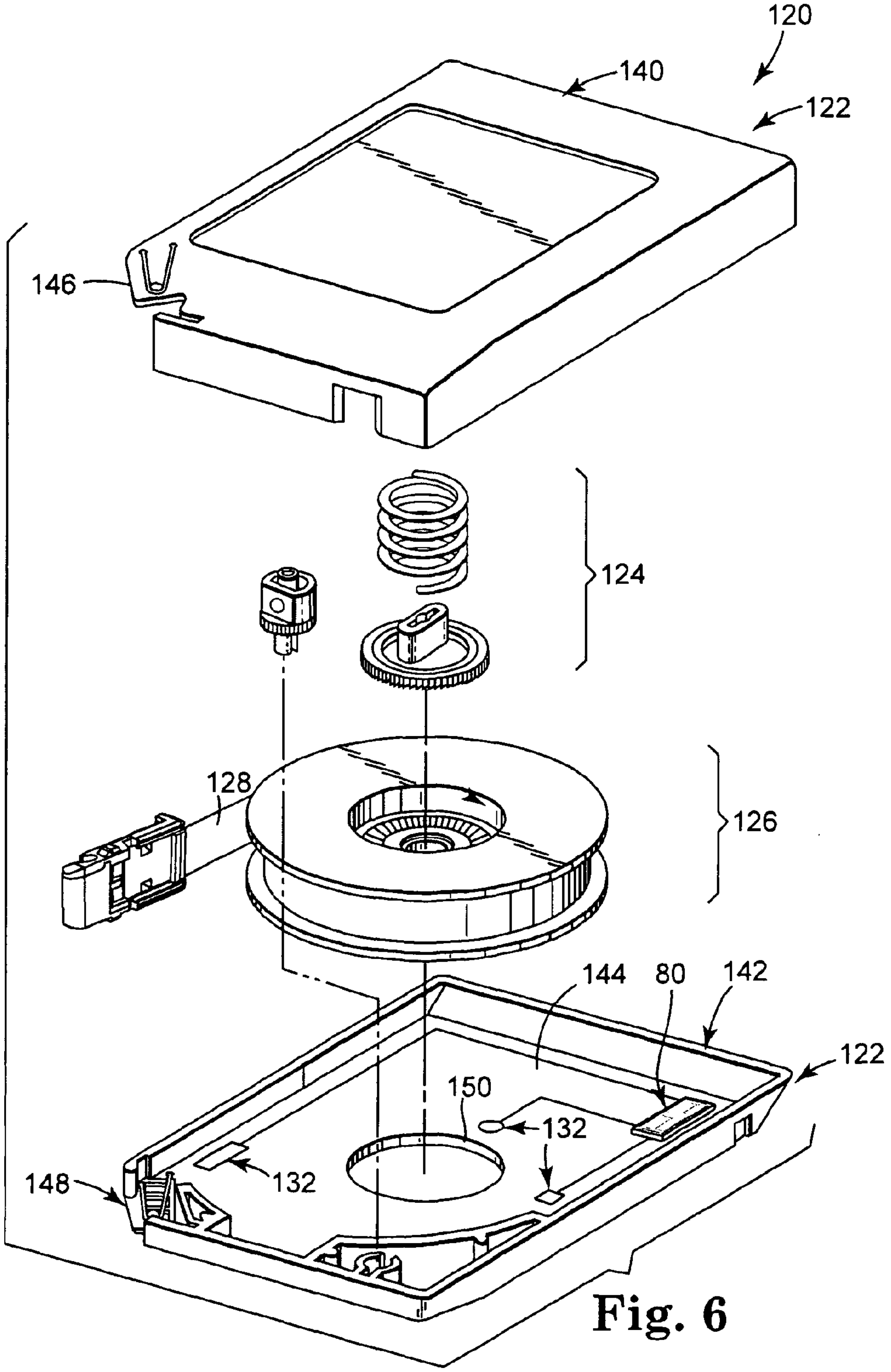
FIG. 6 is an exploded perspective view of a data storage device including a two-way radio configured to enable tracing of the device within a data storage device tracing system according to one embodiment.

FIG. 6 is an exploded perspective view of a data storage device 120 including the two-way radio chip 80 according to one embodiment. The data storage device 120 is illustrated as a single reel data storage tape cartridge including the SOC two-way radio chip 80, but it is to be understood that the device 120 can include other devices, such as micro-hard drives, hard disk drives, quarter inch cartridges and scaleable linear recording cartridges. In this regard, the SOC two-way radio chip 80 is sized/configured for insertion into, or placement onto, data storage devices.

With the above discussion in mind, the exemplary data storage device 120 includes a housing 122, a brake assembly 124, a tape reel assembly 126, a storage tape 128, the two-way radio chip 80, and one or more sensors 132 communicating with the two-way radio chip 80. The tape reel assembly 126 is disposed within the housing 122 and maintains the storage tape 128.

The housing 122 is sized for insertion into a typical tape drive (not shown). Thus, the housing 122 exhibits a size of approximately 125 mm×110 mm×21 mm, although other dimensions are equally acceptable. The housing 122 defines a first housing section 140 and a second housing section 142. In one embodiment, the first housing section 140 forms a cover, and the second housing section 142 forms a base. It is understood that directional terminology such as “cover,” “base,” “upper,” “lower,” “top,” “bottom,” etc., is employed throughout the Specification to illustrate various examples, and is in no way limiting.

The first and second housing sections 140 and 142, respectively, are sized to be reciprocally mated to one another to form an enclosed region 144 and are generally rectangular, except for one corner 146 that is preferably angled to form a tape access window 148. The tape access window 148 provides an opening for the storage tape 128 to exit the housing 122 and be threaded to a tape drive system (not shown) for read/write operations. In addition to forming a portion of the tape access window 148, the second housing section 142 also forms a central opening 150. The central opening 150 facilitates access to the tape reel assembly 126 by a drive chuck of the tape drive (neither shown). During use, the drive chuck enters the central opening 150 to disengage the brake assembly 124 prior to rotating the tape reel assembly 126 for access to the storage tape 128.

The storage tape 128 is preferably a magnetic tape of a type commonly known in the art. For example, the storage tape 28 can be a balanced polyethylene naphthalate (PEN) based substrate coated on one side with a layer of magnetic material dispersed within a suitable binder system, and coated on the other side with a conductive material dispersed within a suitable binder system. Acceptable magnetic tape is available, for example, from Imation Corp., of Oakdale, Minn.

As a point of reference, the tape reel assembly 126 and the storage tape 128 have been described above as one form of data storage media. However, it is to be understood that other forms of data storage media are equally acceptable. For example, the data storage media can include magnetic discs, optical tapes, optical discs, and any non-volatile data storage device configured to be disposed within a device housing.

In one embodiment, the two-way radio chip 80 is a ZigBee™-compliant radio similar to that illustrated in FIGS. 3 and 4 and is configured to support various network topologies, such as star, mesh and cluster tree topologies.

The sensors 132 can assume a wide variety of forms and perform a wide variety of functions. In one embodiment, the sensors 132 include a door sensor for sensing the storage tape 128 exiting tape access window 148, a tape rotation sensor for sensing movement of the storage tape 128, a temperature sensor, a tampering sensor, and/or an acceleration sensor. The sensors 132 are electrically coupled to the two-way radio chip 80, for example, via wiring, in a manner that enables the two-way radio chip 80 to communicate the sensed condition across the network. In general, the sensors 132 can be optical sensors, mechanical sensors, and/or micro-electronic mechanical system (MEMS) sensors, and can be disposed at any location throughout the enclosed region 144 or on the housing 122. With this in mind, the illustrated positions of the sensors 132 represent but one possible placement configuration, and it is understood that other placement configurations for some or all of the sensors 132 and/or additional sensors relative to the housing 122 are equally acceptable.

In one embodiment, the data storage device 120 is a newly manufactured device and the two-way radio chip 80 is disposed within the enclosed region 144 to minimize or prevent tampering with the transceiver. In one embodiment, the housing 122 includes an anti-static additive and/or coating as known in the art that is configured to minimize or eliminate undesirable static electricity charge build-up on the housing that might effect the electronics of the two-way radio chip 80 coupled to the housing 122.

In this Specification, and with reference to FIG. 1, a network coordinator, such as network coordinator 42, is by definition configured to establish a network, configured to communicate with all nodes in the network, and configured to control a network. A router is defined to support data routing functions, and is configured to communicate with other routers, communicate with network coordinators, and configured to communicate with end devices (such as the container 32). An end device is defined to have hardware and capability configured to communicate with a router, or a network coordinator. Each of the coordinator, the router, and the end device is a logical device that can be either a full function device (FFD) or a reduced function device (RFD). Full function devices are defined to be a device having memory and power capability to enable network coordination and network routing. Reduced function devices have less power than an FFD and less memory than an FFD, such that the RFD is configured to only talk to routers or to network coordinators (and not to other RFDs). In this regard, the network coordinator and the network router are logical device types that are always FFD, and an end device is a logical device that can be either an FFD or a RFD. Tracing system 20 is compatible with and operable in a variety of network topologies.

Figure 7A:
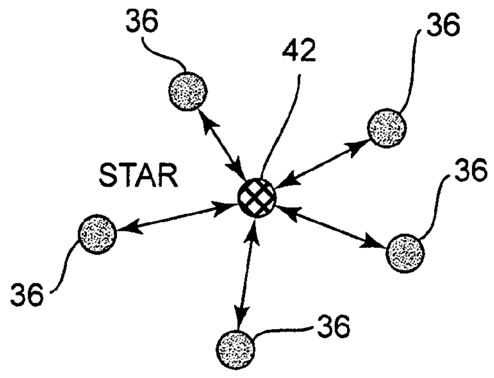
FIG. 7A is a diagrammatic view of a star network topology of the data storage device tracing system.

FIG. 7A is a diagrammatic view of a star network topology of the data storage device tracing system 20. In this embodiment, and with reference to FIG. 1, container 32 includes a two-way radio 36 that is configured as a reduced function device. Consequently, two-way radio 36 does not communicate with other reduced function devices, such as another two-way radio 36 in the star network. Each of the reduced function devices (two-way radios 36) communicates with the network coordinator 42 (which is an FFD). The tracing system 20 provides real-time data date communication between the reduced function device two-way radios 36 and the network coordinator 42, which enables the system 20 to track the position of the container 32 and the conditions of the devices 34 within the container 32. In one embodiment, the tracing system 20 tracks in real-time the position of the container 32 (i.e., an asset) as it moves from one facility to another facility.

Figure 7B:
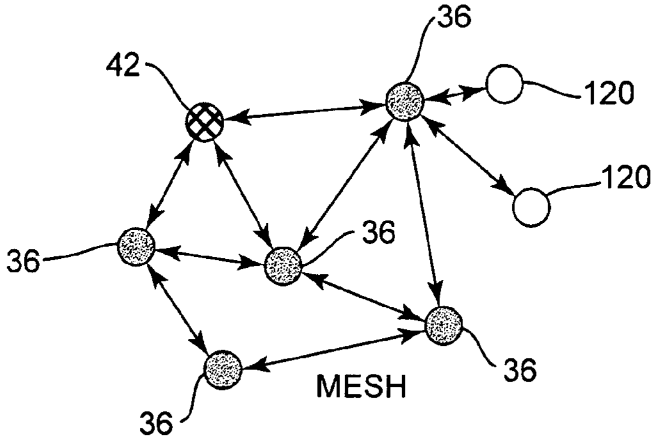
FIG. 7B is a diagrammatic view of a mesh network topology of the data storage device tracing system.

FIG. 7B is a diagrammatic view of a mesh network topology of the data storage device tracing system 20. In this embodiment, each of the data storage devices 120 includes a ZigBee™-enabled two-way radio 80 (FIG. 6) provided as a RFD that communicates with the two-way radio 36 (FFDs) located inside container 32. The reduced function data storage devices 120 are configured for two-way radio communication with the two-way radio 36, and the two-way radio 36 is configured for two-way radio communication with the network coordinator 42. In some embodiments, the two-way radio 36 is coupled to a battery 82 (FIG. 1) having sufficient power/energy to enable the two-way radio 36 to be an FFD. Generally, the power source coupled to ZigBee™-enabled two-way radio 80 is sized to enable the radio 80 to be a RFD.

Even though the data storage device 120 is a reduced function device, it is able to communicate with other reduced function devices 120 through the two-way communication with the two-way radio 36. In the specific example illustrated in FIG. 7B, one reduced function data storage device 120 is configured for two-way communication with the two-way radio 36, which is likewise configured for two-way radio communication with another reduced function data storage device 120. In this manner, one reduced function data storage device 120 is able to communicate through the mesh topology of network 40 with another reduced function data storage device 120 at a different location. To this end, even though the reduced function data storage device 120 may have a communication range that is limited to a range of less than the network range, one reduced function data storage device is able to communicate through the network coordinator and routers in the network, across the coordinator/router network, and increase its range in communication with other two-way radios and other reduced function data storage devices 120. Thus, FIG. 7B illustrates one embodiment of a network-wide node-to-node communication scheme for reduced function data storage devices 120.

Figure 7C:
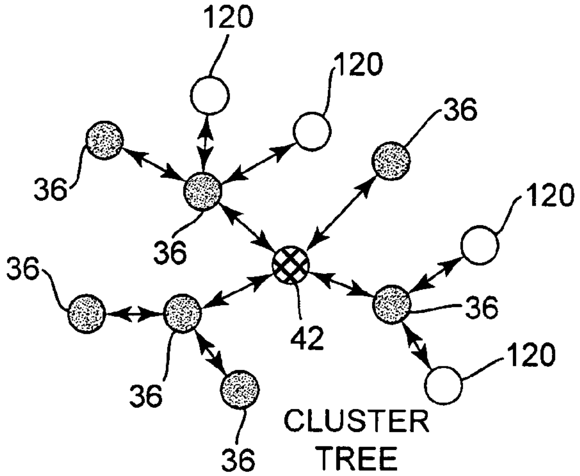
FIG. 7C is a diagrammatic view of a cluster tree network topology of the data storage device tracing system.

FIG. 7C is a diagrammatic view of a cluster tree topology of the data storage device tracing system 20. Similar to the exemplary embodiments of FIG. 7B, the cluster tree topology of FIG. 7C enables reduced function data storage devices 120 having two-way radios to communicate across the network coordinator/routers in the network 40, through other full function device two-way radios 36, to other reduced function data storage devices 120 in the network. In this manner, the range of a reduced function data storage device 120 is increased to have a range of radio communication equal to a range defined by the network 40.

With the above in mind, embodiments illustrated in FIG. 7B and FIG. 7C provide a wireless router path for the interactive common communication between router nodes in the network 40. One embodiment of the system 20 provides node-to-node communication throughout the network 40, and tracking/monitoring of multiple objects (data storage devices 120 and/or containers 32) in the network 40. In one embodiment, the two-way radios 36, 80, 120 employ a ZigBee™ protocol. In one embodiment, each data storage device 120 and container 32 is configured for the real-time data transmission of shipping conditions through the network coordinator 42, and configured for communication between each ZigBee™-enabled data storage device 120 and ZigBee™-enabled container 32. Other transceiver and/or radio protocols are also acceptable.

In one embodiment, the two-way radios 36, 80, 120 are configured as active devices programmed to send/transmit a scheduled message across network 40. For example, active two-way radios 36, 80, 120 ping, or transmit, information at a selected timed interval (every ten seconds, or every five seconds, etc). In an exemplary embodiment, temperature is monitored by sensors 64, and if the temperature begins to exceed a selected limit, the active two-way radio 36, 80, 120 wakes up, takes a sample of the temperature at the selected timed interval, and pings/transmits that information to the coordinator 42. The communication ping rate is selectively enabled by the system; in some cases the ping rate is selected to be two or more pings per minute, for example; in other cases, the communication ping rate is once every several minutes.

In one embodiment, the nodes (or routers) of the system 20 are located in a corridor, or at the intersection of two corridors, and system 20 tracks the movement of ZigBee™-enabled assets within a building as the asset(s) travel node-to-node along the corridors traversing the network 40.

Figure 8:
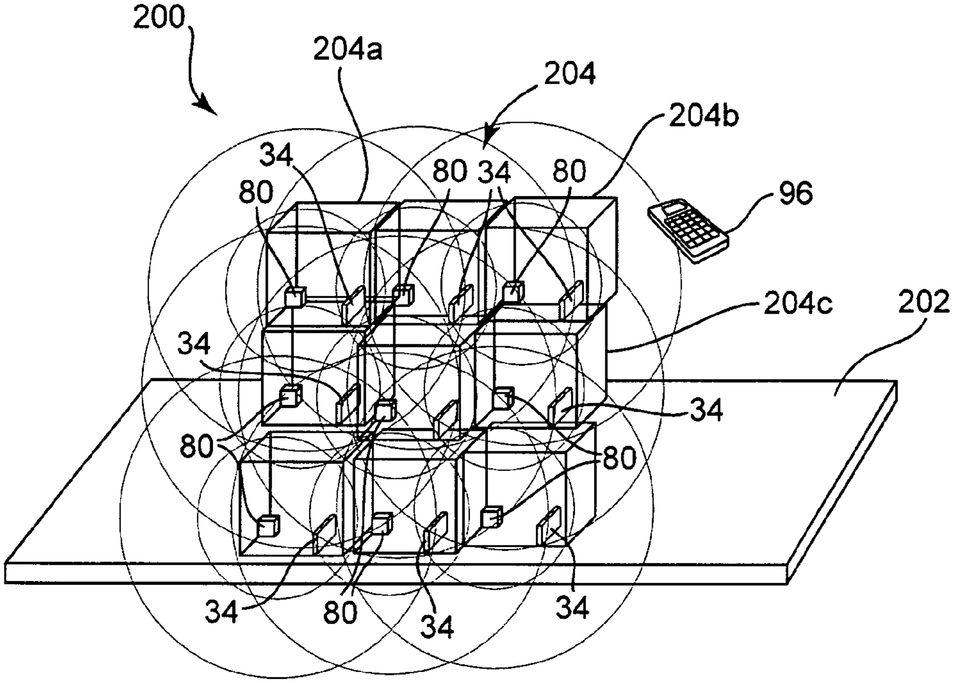
FIG. 8 illustrates a data storage device tracing system including a pallet containing multiple traceable containers of devices according to one embodiment.

FIG. 8 is a diagrammatic view of a data storage device tracing system 200 according to another embodiment. The tracing system 200 includes a pallet 202 maintaining multiple shipping containers 204, where each shipping container 204 includes a ZigBee™-enabled two-way radio chip 80, one or more data storage device(s) 120 as described in FIG. 6, and a cellular network unit 96 (not shown) communicating with the two-way radio chip 80. For clarity of the line drawing, one data storage device 120 is shown within each container 204, although it is understood that the containers 204 are configured to carry multiple devices 120.

One embodiment of the tracing system 200 includes a mesh topology and/or cluster tree topology that enables two-way radio communication between the data storage devices 120 and the two-way radios 80. In one embodiment, the data storage devices 120 include a reduced function two-way radio device configured to communicate other data storage devices 120 (See FIG. 6). By the embodiments described above, the data storage devices 120 communicate with the two-way radio chip 80 in the containers 204, and other such data storage devices 120 in other containers 204.

In this regard, if one of the containers 204, for example, container 204*b*, is removed from the pallet 202, this change in physical location of the container 204*b* and its movement is communicated to the system 200. The system 200 tracks the movement of the container 204*b* until the two-way radio chip 80 moves beyond range of the system 200 (thus identifying a location where the container 204*b* had become "lost"). In addition, should the container 204*b* be opened when in range of the system 200 and one of the data storage devices 120 removed, the movement and other shipping conditions of container 204*b* is communicated by two-way radio 80 transmission throughout the network. The system 200 is in this manner configured to track shipping conditions (including physical location and physical conditions) of container 204*b* throughout the network on a real-time basis.

Figure 9:
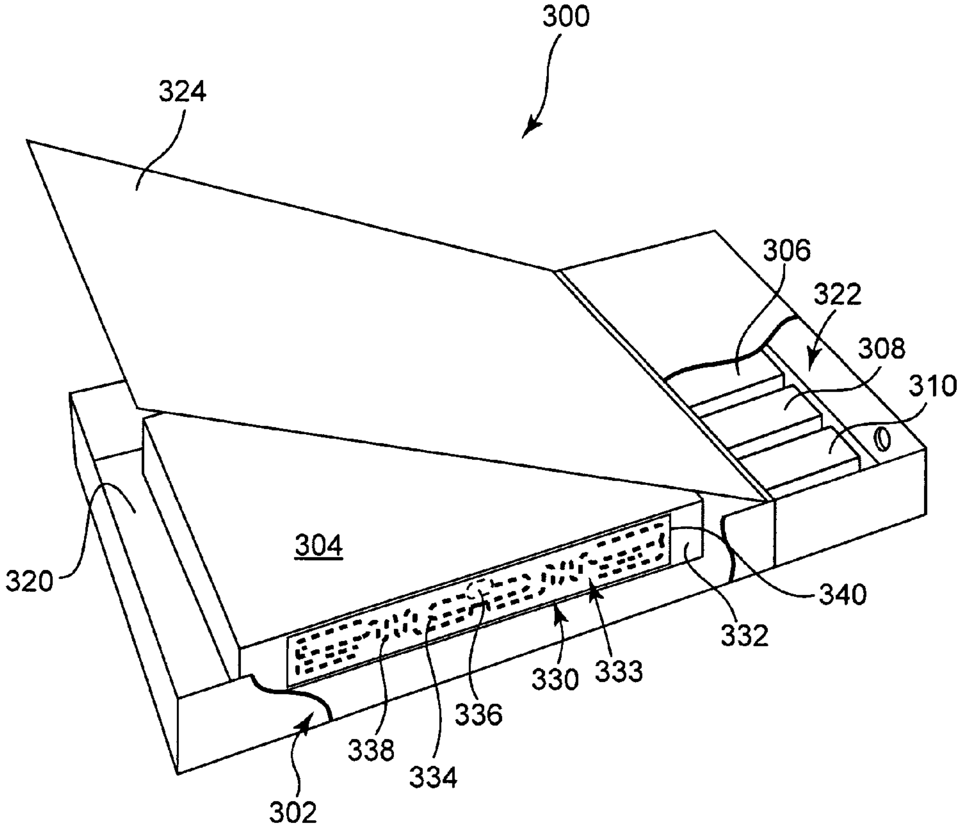
FIG. 9 illustrates a data storage device tracing assembly including a sleeve housing an existing data storage device and a two-way radio that enables the data storage device to be traced according to one embodiment.

FIG. 9 illustrates a data storage device tracing assembly 300 including a sleeve 302 housing a data storage device 304, an RFID reader unit 306, a GPS unit 308, and a two-way radio 310 that combine to globally track and trace the data storage device 304.

The sleeve 302 defines a container having a first compartment 320 configured to receive the data storage device 304, and a second compartment 322 configured to retain the RFID reader unit 306, the GPS unit 308, and the two-way radio 310. In one embodiment, a movable cover 324 is provided that is hinged to one end of the first compartment 320. Access to the compartment 320 can be gained by opening the cover 324, which is useful when placing the data storage device 304 into the sleeve 302 for global tracking and tracing.

The data storage device 304 includes data storage tape cartridges, micro-hard drives, hard disk drives, quarter inch cartridges and scaleable linear recording cartridges (described above). In one embodiment, the data storage device 304 is RFID-enabled and includes a device tag 330 coupled to a housing 332 of the device 304. In one embodiment, the device tag 330 includes an RFID inlay 333 having circuitry 334, a memory chip 336, an antenna 338, and a label 340 attached over the inlay 333. In general, the memory chip is configured to electronically store information related to the device 304, including information printed onto the label 340, and the RFID reader unit 306 is configured to read the information stored on the memory chip 336. The label 340 can be printed with identifying information such as a VOLSER number related to the device 304.

The device tag 330 can be characterized as a "passive" device since it only communicates information when commanded to do so by the reader unit 306 (for example when the reader unit 306 energizes a field that interacts with the antenna 338 of the device tag 330). In contrast, the two-way radio 310 is configured to both receive and transmit information via transceiver 90 (FIG. 3), such that the two-way radio 310 is characterized as an "active" device.

In one embodiment, the data storage device 304 is placed in the sleeve 302 and the RFID reader unit 306 reads the information stored on the device tag 330. The device 304 is thus "known" to the reader unit 306. The reader unit 306 is configured to wirelessly transmit this information to the two-way radio 310 for subsequent transmission over a system as described above. One suitable reader unit 306 is available from Feig Electronics, Weilburg, Germany.

RFID tracing of RFID-enabled data storage devices is described in commonly assigned U.S. application Ser. No. 11/520,459, filed Sep. 13, 2006, entitled "SYSTEM AND METHOD FOR TRACING DATA STORAGE DEVICES." The device RFID tag and the tracing of such RFID-enabled devices is described in U.S. application Ser. No. 11/520,459, between pages 5-19, for example. U.S. application Ser. No. 11/520,459 is incorporated herein by reference in its entirety.

In one embodiment, the GPS unit 308 obtains the position of the sleeve 302 and wirelessly communicates this position information to the two-way radio 310 for subsequent transmission over a system as described above.

The two-way radio 310 is similar to the two-way radio chip 80 described above. In one embodiment, the two-way radio 306 includes a battery pack (not shown) or other power source that is also housed within the compartment 322.

The system 20 (FIG. 1) described above provides one embodiment for the real-time tracing of a data storage device 34 within the network 40. Other embodiments described above provide a data storage device 120 that includes a two-way radio chip 80 that enables real-time tracing of the data storage device 120 in a network of like devices 120.

In contrast, the data storage device tracing assembly 300 provides a mechanism for tracing an existing data storage device, such as device 304, that has been manufactured and does not include a two-way radio within the housing 332. For example, customers and users have a desire to trace and monitor the real-time data of an existing data storage device, including the conditions to which the existing data storage device is exposed. The data storage device tracing assembly 300 enables an existing data storage device 304 to be retro-fitted with real-time tracing technology by configuring the data storage device 304 for shipment and movement in transit within the sleeve 302. One embodiment of the two-way radio 310 includes a battery and memory of sufficient capacity such that the two-way radio 306 is an FFD. In this regard, the device tracing assembly 300 is compatible with mesh network topologies and cluster tree network topologies, described above.

In one embodiment, the sleeve 302 is formed of a plastic material and includes an openable compartment 320 for access to devices 304 in-transit, and an enclosed compartment 322 that houses the RFID reader unit 306, the GPS unit 308, and the two-way radio 310 in a tamper-resistant manner. In other embodiments, the sleeve 302 includes metallic components, although it is desirable to select materials that do not interfere with the transmission of the RFID reader unit 306, the GPS unit 308, and the two-way radio 310. In one embodiment, the cover 324 is configured to selectively lock the first compartment 320. In other embodiments, the cover 324 is optional and the data storage device 304 is maintained within the first compartment 320 by a tie-down or other like device.

Embodiments described above enable the tracking of assets within a facility. The Sarbanes-Oxley Act and other regulations have encouraged businesses to closely track the whereabouts of data storage devices that back up sensitive business information. Some businesses photograph and fingerprint the person (a handler) responsible for handling the data storage devices when the devices are moved from one location in a building to another location in the building. The photograph and fingerprints are employed as a security measure to confirm that the handler checking the devices out of a location is the same person who delivers the devices to their eventual destination. This form of tracking is expensive and time consuming, and does not address the problem of locating a device if it becomes lost.

In contrast, embodiments described above provide for the two-way radio detection and tracking of assets moving within a building. In one exemplary embodiment, multiple data storage devices are housed in a parent container (such as a trolley). The parent trolley can include a locked door and/or other security layers. Each of the data storage devices to be transported is referred to as a child of the parent trolley. One embodiment provides for the RFID scanning of child information from the data storage devices that are housed in the parent trolley, as described in commonly assigned U.S. application Ser. No. 11/520,459 incorporated herein and referenced above. The parent trolley includes a ZigBee™-enabled two-way radio 80 that is configured to communicate with a network coordinator 42 and its associated router. The network can include an applications programming interface configured to mange the ZigBee™-enabled network from a user-defined application (operable from a computer or handheld device, for example). In this manner, movement and location of the parent trolley, and movement and location of each child data storage device, is tracked in real-time within the network.

It will be recognized that it may be desirable to configure the network to include the hallways connected between a storage area and a business unit area, and to provide alerts (visual and/or auditory) for the uncharted movement of the trolley beyond the designated hallways, or movement of the trolley within a given distance from an exit door.

In one embodiment, the two-way radio chip 80 associated with the parent trolley includes a radio frequency (RF) transceiver 90 having an antenna. The power radiated from the transceiver 90 antenna is calibrated as a function of distance relative to a receiver. For example, the power given off by the transceiver 90 antenna is measured as a function of distance away from a receiving antenna within the network, thus providing a correlation between power radiated from the two-way radio and distance. In this manner, the power received by the receiving antenna, which is preferably fixed in location (for example at a hallway intersection), is employed to correlate how far away the trolley is from the receiving antenna, thus providing data related to the physical location of the trolley in the network grid. Iterative measurements of the power radiated from the two-way radio chip 80 can be used to determine if the trolley is moving toward or away from the receiving antenna, as well as the distance that the trolley is away from the receiving antenna.

The trolley/container can include sensors that communicate with the ZigBee™-enabled two-way radio 80, such as an acceleration sensor that sense whether the trolley is stalled (not moving), one or more sensors to register the opening of the door(s), movement of the trolley to a non-secure area, and/or a shock sensor to sense a trolley crash.

Embodiments provide a system for tracing the location and condition of in-transit data storage devices moving between facilities or moving within a facility. Embodiments of a data storage device tracing system provide a container for data storage devices that is configured to interact with terrestrial (cellular and other) networks and track the global positioning coordinates of the container and pass this information onto a host when pinged. Other embodiments provide a tracing system configured to interact with a ZigBee™ host to communicate information regarding data storage device and/or container location when within the host's range, movement relative to the host, temperature, acceleration, create a loud audible noise when tampered with the sleeve and pass the information to the cellular host. Other embodiments provide a tracing system including RFID-enabled data storage devices, a GPS cellular unit, a ZigBee™ controller, and a battery pack. Other embodiments provide a tracing system including one or more tamper sensors built-in to a sleeve that is configured to enclose a data storage device and enable tracing of the data storage device. Other embodiments provide a tracing system including a database for tracking data storage devices when they are checked-in and checked-out of a facility, for example, by employing RFID tags and two-way radio data transfer. One embodiment of the database provides ledger for managing an inventory of data storage devices based on the data transferred through the ZigBee™ controller in combination with RFID-enable tags attached to the devices.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A data storage device case configured to be traced in a network of traceable data storage devices, the data storage device case comprising:

a housing defining an enclosure, wherein the enclosure includes a first compartment and a second compartment;

one or more data storage devices disposed within the first compartment of the enclosure, wherein each of the data storage devices includes a radio frequency identification (RFID) circuit;

a device two-way radio disposed within the second compartment of the enclosure;

a global positioning system (GPS) unit disposed within the second compartment of the enclosure, wherein the GPS unit generates positioning information associated with the data storage device case; and an RFID reader unit disposed within the second compartment of the enclosure, wherein the RFID reader unit reads the RFID circuit of each of the data storage devices to generate RFID data, wherein the device two-way radio receives the positioning information from the GPS unit, receives the RFID data from the RFID reader unit, and communicates real-time data comprising the positioning information and the RFID data to the network coordinator that is configured to communicate with the network of traceable data storage devices.

2. The data storage device of claim 1, wherein the device two-way radio is coupled to an interior surface of the housing.

3. The data storage device of claim 1, wherein the device two-way radio comprises a system-on-a-chip (SOC), the SOC comprising an IEEE 802.15.4 physical layer operable at 2.4 GHz and a ZigBee media access control layer communicating with the physical layer.

4. The data storage device of claim 1, wherein the network coordinator is configured to communicate with a cellular network of traceable data storage devices.

5. A data storage device tracing system comprising:

at least one container comprising a first compartment and a second compartment wherein the first compartment is configured to house and contain one or more electronic data storage devices;

one or more electronic data storage devices contained in the first compartment of the container, wherein each of the data storage devices includes a radio frequency identification (RFID) circuit;

a network including a network coordinator; and means for the network coordinator to transmit to and receive real-time container location data from the container, wherein the means includes a device two-way radio disposed within the second compartment, a global positioning system (GPS) unit disposed within the second compartment, wherein the GPS unit generates positioning information associated with the container, and an RFID reader unit disposed within the second compartment, wherein the RFID reader unit reads the RFID circuit of each of the electronic data storage devices to generate RFID data, wherein the two-way radio receives the positioning information from the GPS unit, receives the RFID data from the RFID reader unit and communicates real-time data comprising the positioning information and the RFID data to the network coordinator over the network.

6. The data storage device tracing system of claim 5, wherein the at least one electronic data storage device comprises an active transceiver device that is configured to transmit to and receive real-time data from the network coordinator.

* * * * *